United States Patent [19]

Mohsin

[11] Patent Number: 4,542,994
[45] Date of Patent: Sep. 24, 1985

[54] FLUID BEARINGS

[75] Inventor: Mohamed E. Mohsin, Alkrington, England

[73] Assignee: National Research Development Corporation, London, England

[21] Appl. No.: 554,393

[22] Filed: Nov. 22, 1983

[30] Foreign Application Priority Data

Nov. 24, 1982 [GB] United Kingdom ............... 8233462

[51] Int. Cl.[4] ..................... F16C 21/00; F16C 32/06
[52] U.S. Cl. .................................. 384/101; 384/111; 384/118
[58] Field of Search ............... 384/101, 102, 111, 112, 384/115, 120, 118

[56] References Cited

U.S. PATENT DOCUMENTS 3,065,036 11/1962 Trotter .............................. 384/101
3,332,726 7/1967 Cooper .............................. 384/101
3,759,588 9/1973 Anderson ........................... 384/101
4,005,559 1/1977 Korrenn et al. ..................... 384/101

Primary Examiner—Lenard A. Footland
Attorney, Agent, or Firm—Cushman, Darby & Cushman

[57] ABSTRACT

A fluid bearing in which parts of the bearing land are free to move relative to the bearing member on which they are mounted, so that in use the speed of the relative movement of the two confronting surfaces that define the bearing clearance is less than the speed of relative movement of the bearing members themselves. This reduces the power losses due to shearing effects within the thin film of fluid continuously passing through the bearing clearance in contact with these confronting surfaces. The invention applies particularly to rotary bearings of journal and end-thrust type, in which the moving lands may be ring-shaped units, mounted for rotation about the bearing axis and supported by relatively friction-free bearings—for instance gas bearings—on the bearing member in which the bearing recess is formed.

6 Claims, 9 Drawing Figures

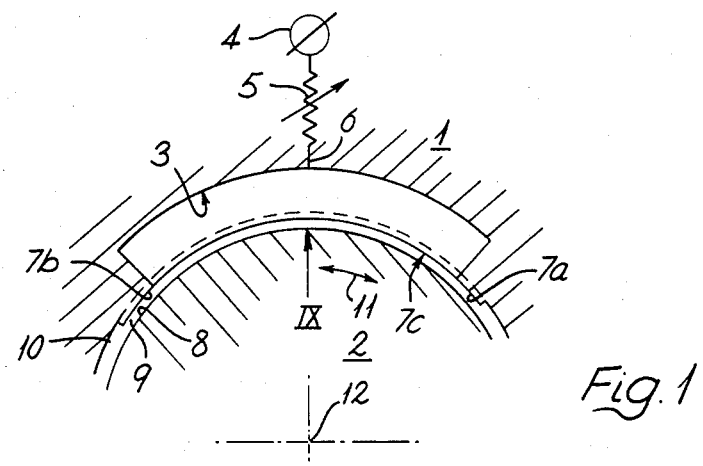
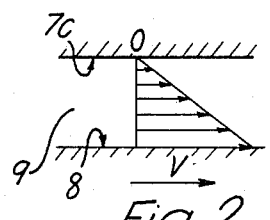
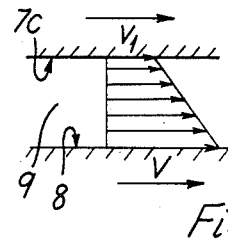
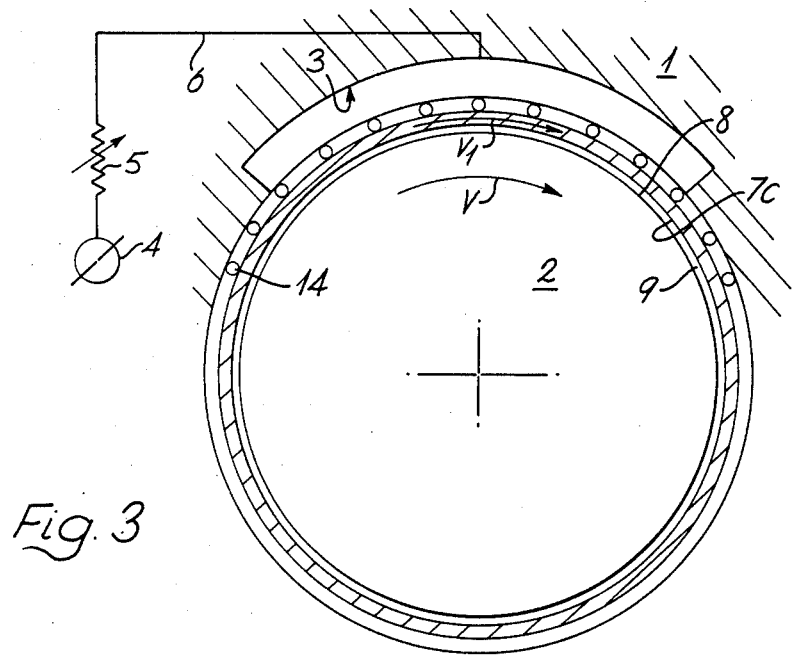

FLUID BEARINGS

This invention relates to hydrostatic and other fluid bearings comprising two bearing members, movable relative to each other, one of which carries or is formed with a recess. In use this recess is connected to a source of pressurized fluid and the surface of a structural part situated immediately around the edge of the recess, known as the "land", confronts a surface presented by the other member, the two surfaces being separated by a clearance filled by a thin film of fluid that escapes continuously from the recess because source pressure is above ambient. Such bearings are well known, and the characteristics of known and typical bearing fluids offer the promise both of low friction movement between the two members in directions parallel to the faces of the film, and of high stiffness and capacity to withstand loads in the perpendicular directions. Such bearings may, for instance, be of a linear or rotary kind in which the relative movement is linear or rotary respectively. In rotary bearings the reaction between the two members may be radial or axial, or indeed both. While it is known for the stationary and movable members of such bearings to be capable of a greater variety of relative movement, and while this invention is capable of being applied to bearings in which such greater variety of relative movement is possible, the invention will be described in relation to rotary movement of one bearing member relative to the other. Moreover, while the invention applies also to bearings in which the member carrying the recess is movable and the other member presenting the confronting surface is stationary, for ease of description in the remainder of this specification it will be assumed that the recessed member is the stationary one and the other member is moving.

Most of the fluids used to pressurize the recesses typical hydrostatic bearings offer low friction movement only when the relative velocity between the two bearing members, in directions parallel to the faces of the film, is low. However, when such relative velocity increases the fluid friction rises very quickly because it is proportional to the square of this relative velocity. Hence, high speed bearings of this kind will consume high levels of frictional power which will dissipate in the form of heat. Most of this power is consumed in shearing the thin film of fluid in the bearing clearance as a result of the relative velocity between the stationary lands and the confronting moving surface. Usually such lands are rigidly connected to the rest of the body including the recess as shown in FIGS. 1 and 9 of the accompanying drawings; FIG. 1 is a diagrammatic section, taken in a radial plane, through a known type of journal bearing, and in which numerals 1 and 2 denote the two members of the bearing. Recess 3, formed in member 1, is supplied with fluid under pressure from a pump 4 by way of a resistance 5 and a conduit 6; in some applications the resistance would normally be fixed, in others controllably-variable as shown. The edges of the recess are surrounded by and rigidly fixed to a raised "land" 7. In use, the surface of this land lies parallel to but spaced from the surface 8 of member 2, the narrow clearance 9 between these two surfaces being filled by a thin and moving film of fluid. Ambient pressure exists in the deeper space 10 that typically exists between members 1 and 2 outside clearance 9. In use, let it be assumed that member 1 is stationary, and that member 2 can move relative to it in either sense in the direction of arrow 11. Lands 7a and 7b are called axial lands because their long dimension lies parallel to the bearing axis 12. Land 7c and the remaining land 7d, not shown in FIG. 1 because it lies in front of the plane of the section, will be referred to as circumferential lands because their long dimensions lie parallel to the circumferences of members 1 and 2. The same adjectives may be used to refer to clearances beneath lands.

In a typical bearing of the kind described in FIG. 1 the lands are integral with or rigidly fixed to the stationary member 1, where the recess is formed, and hence the relative velocity between the lands and the confronting surface of member 2 will be equal to the velocity V of that moving member. FIG. 2 shows the velocity profile across the thickness of the fluid film 9 of FIG. 1 in graphical form.

According to the present invention a fluid bearing comprises two bearing members, adapted in use to be separated by a fluid film and to move relative to each other in a predetermined direction. A bearing recess is associated with one of the members so that the recess mouth confronts the other member, the recess is adapted to be connected in use to a source of fluid under pressure, a bearing land supported on one of the bearing members encompasses the recess mouth and co-operates with the other member to define a shallow clearance through which the fluid escapes from the recess and in which the fluid exerts the force required to maintain the two members separated, and at least part of the land is supported so that it is capable in use of moving relative to its supporting bearing member in a direction parallel to the said direction of relative movement of the two bearing members.

The movable land part may be attached to its supporting bearing member by auxiliary bearings, for instance of rolling-contact type or in the form of gas bearings.

The land is preferably supported by the bearing member in which the recess is formed.

The fluid bearing may be of journal type, comprising a shaft member rotatable relative to a surrounding housing member and having a plurality of bearing recesses formed in one of those members and confronting the other radially, in which the peripheries of the mouths of those recesses include straight sections lying in substantially circumferential directions, and in which the parts of the land aligned with those sections are mounted for circumferential movement. These moving parts of the land may be constituted by continuous ring-shaped units, mounted on one of the bearing members—typically the stationary housing member—for rotation relative to it about the bearing axis.

Alternatively the fluid bearing may be of rotary thrust type comprising a shaft member in end-on confrontation with the other bearing member in an axial direction, in which the periphery of a recess mouth includes curved sides each concentric with the bearing axis, and which the moving parts of the land are adjacent those sides and mounted for rotary movement about the bearing axis. These parts may, as with the journal-type bearing just described, be of ring form.

The invention will now be described, by way of example, with reference to the further accompanying drawings in which:

FIG. 3 is a diagrammatic section, taken in a radial plane, through a journal bearing;

FIG. 4 is a graphical representation of the velocity profile across the thickness of the fluid film of the bearing of FIG. 3;

Figure 5:
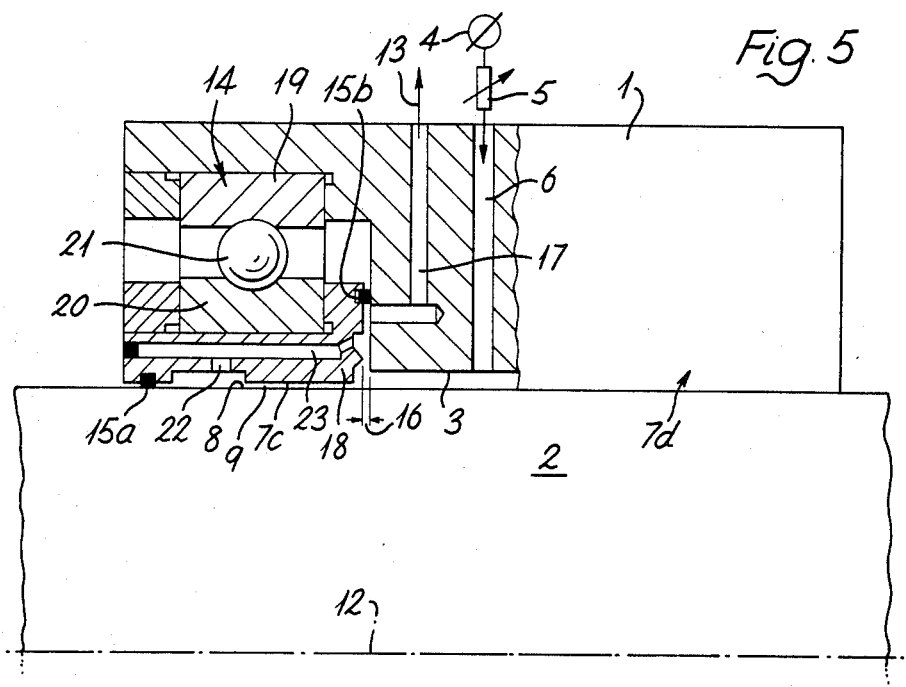
FIG. 5 is a view, partly in elevation and partly in radial section, of a journal bearing.

FIGS. 3 and 4 illustrate the principle of the invention with relation to a rotary fluid bearing in which the circumferential lands 7c and 7d (land 7d not shown in FIG. 3) are able to rotate with velocity $V_1$ around the auxiliary bearing 14 which is fixed to the member 1. The velocity profile across the fluid film 9 of FIG. 3 is shown in FIG. 4. In this case the velocity of the rotating member 2 relative to the circumferential lands 7c and 7d is $(V-V_1)$. Hence, 1. The shear $\tau$ of the fluid film according to the present state of the art as in FIGS. 1 and 2 would be:

$$\tau = \mu V/h \quad (1)$$

where
$\mu$ = viscosity of the fluid
$h$ = thickness of the fluid film 9
and the corresponding power P consumed in shearing the fluid film 9 is $$P = \tau A V = A \cdot \mu V^2/h \quad (2)$$

where A = surface are of the circumferential lands.

2. The shear $\tau_1$ of the fluid film according to the invention as in FIGS. 3 and 4 is:

$$\tau_1 = \mu(V-V_1)/h \quad (3)$$

and the corresponding power $P_1$ consumed in shearing the fluid film 9 is $$\tau_1 A(V-V_1) = A \cdot \mu(V-V_1)^2/h \quad (4)$$

From equations (2) and (4), $$P_1/P = (1-V_1/V)^2 \quad (5)$$

$\tau_1$ is the shear required to drive the auxiliary bearing 14 (FIG. 3) with velocity $V_1$. Hence, $V_1$ depends on the type of auxiliary bearing used. If such bearing is of negligible friction, e.g. gas bearing, then $\tau_1 = 0$ and, from equation (3), $V_1 = V$ which means that there will be no relative movement between the circumferential lands 7c and 7d and the moving member 2. In this case, the power consumed by shearing of the fluid film 9 beneath the circumferential lands will be negligible.

On the other hand, if the frictional characteristics of the auxiliary bearing are the same as those of the circumferential land then:

$$\tau_1 = \tfrac{1}{2}\tau,$$

and $$V_1 = \tfrac{1}{2}V$$

Hence, the power $P_2$ required to drive the auxiliary bearing $$= \tau_1 A V_1 = \tfrac{1}{2}\tau A \cdot \tfrac{1}{2}V = P/4,$$

and the total power consumed by the system, $$P_1 + P_2 = P/2$$

which is half the power consumed by shearing the fluid film under a conventional fixed circumferential land. Hence, a fluid bearing designed according to the invention offers the prospect of the following advantages over a conventional one designed according to the present state of the art:

1. A substantial saving of power depending on the type of auxiliary bearing used. This saving is optimum when the auxiliary bearing is frictionless.

2. The force acting on the circumferential land and hence on the auxiliary bearing is capable of being only a small fraction (in some cases less than 10%) of that carried by the main bearing, allowing the use of, for example, gas bearings as auxiliary bearings: gas bearings have favourable frictional characteristics but are not suitable to carry high loads.

3. The reduced relative velocity $V_1$, between the circumferential land and the stationary member of the main bearing, and $(V-V_1)$, between such land and the moving member, makes it possible to use ordinary contact seals for sealing the fluid inside the recess as well as the fluid leaving the circumferential land through the clearance 9.

4. A bearing according to the present invention offers the added advantage of being a safety measure in case, for any reason, the bearing clearance becomes closed and metal-to-metal contact occurs between the lands and the confronting surface of the other bearing member. In such a case the use of a rolling element bearing as an auxiliary bearing can be useful.

The fluid bearings of FIGS. 5, 6, 7 and 8 are basically similar to that of FIG. 1 in that they each comprise two members 1 and 2 intended for relative movement as already described, and a bearing recess 3 formed in member 1 and supplied from a pump 4 by way of a resistance 5 and conduit 6. However the bearings of FIGS. 5 to 8 differ from that of FIG. 1 in that their circumferential lands 7c and 7d, instead of being an integral part of member 1, are mounted on different types of auxiliary bearings 14 thus allowing them to rotate relative to the stationary member 1 about axis 12. An annular orifice 16 acts as a non-contact seal between the fixed structure of member 1 and the relatively-movable structure 18 which presents the land 7c, to prevent any substantial flow of fluid direct from recess 3 to exhaust 13 by way of conduit 17 without passing through clearance 9, but clearly other types of seal would be practical also. The drag resistance of an orifice such as 16 due to the relative velocity between the circumferential lands and member 1 is small and in most cases can be neglected. Moreover, the construction of member 1 and the circumferential lands may easily permit adjustment of the area of orifice 16 so as to maintain it at a minimum value thus minimizing the fluid flow from the recess 3.

FIG. 5 shows a journal fluid bearing according to the invention in which the structure 18 presenting the land 7c is supported from the fixed structure of member 1 by an auxiliary ball bearing 14 comprising races 19, 20 and balls 21. Having passed through clearance 9 from recess 3, fluid passes to exhaust by way of a port 22 and conduit 23, both formed in structure 18, and then conduit 17. Contact seals 15a and 15b seal the fluid within the bearing: Seals of this type will in practice be suitable for the reduced relative velocities $V_1$ and /or $(V-V_1)$, compared with the high V of FIGS. 1 and 2.

Figure 6:
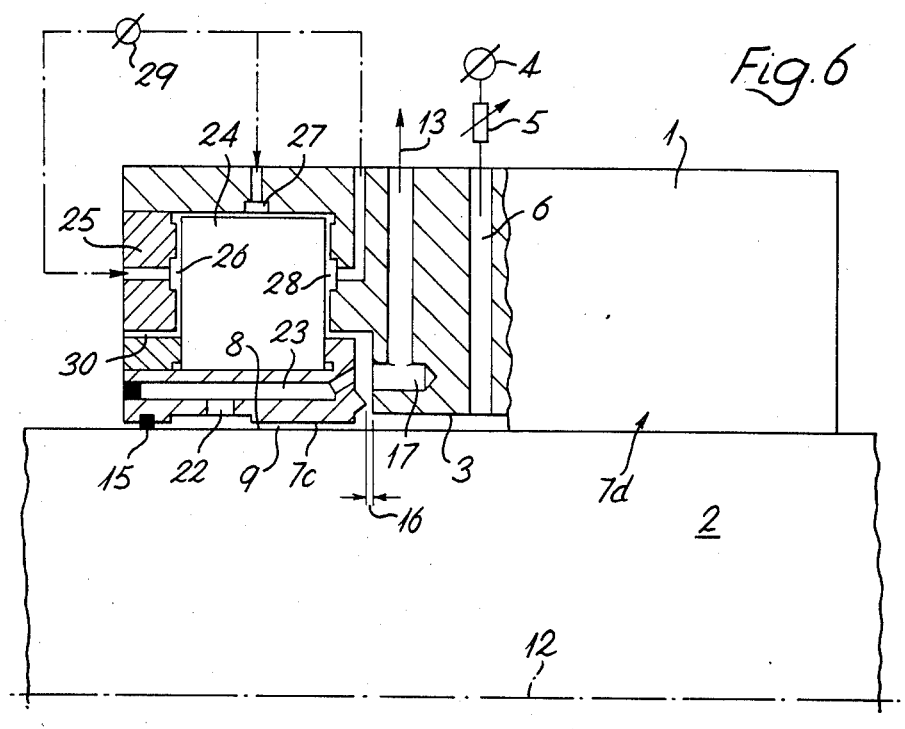
FIG. 6 is a similar view of another journal bearing.

FIG. 6 shows a similar journal bearing but using an auxiliary gas bearing in which the structure 18 includes a ring-shaped member 24 running with slight clearance within a channel defined partly by the main structure of member 1 and partly by an annular plug 25 fixed to that structure. Within this channel the ring 24 is supported by gas supplied to pads 26–28 from a pressurized gas supply indicated diagrammatically at 29. The gas so introduced escapes from the clearance between the ring and its surrounding channel to ambient pressure either by way of outlet 30, or to outlet 13 by way of conduit 17. Having passed from recess 3 through clearance 9, the bearing fluid flows to exhaust 13 by way of port 22 and conduit 23 as before, and a contact seal 15 works similarly to the seal 15a of FIG. 5.

Figure 7:
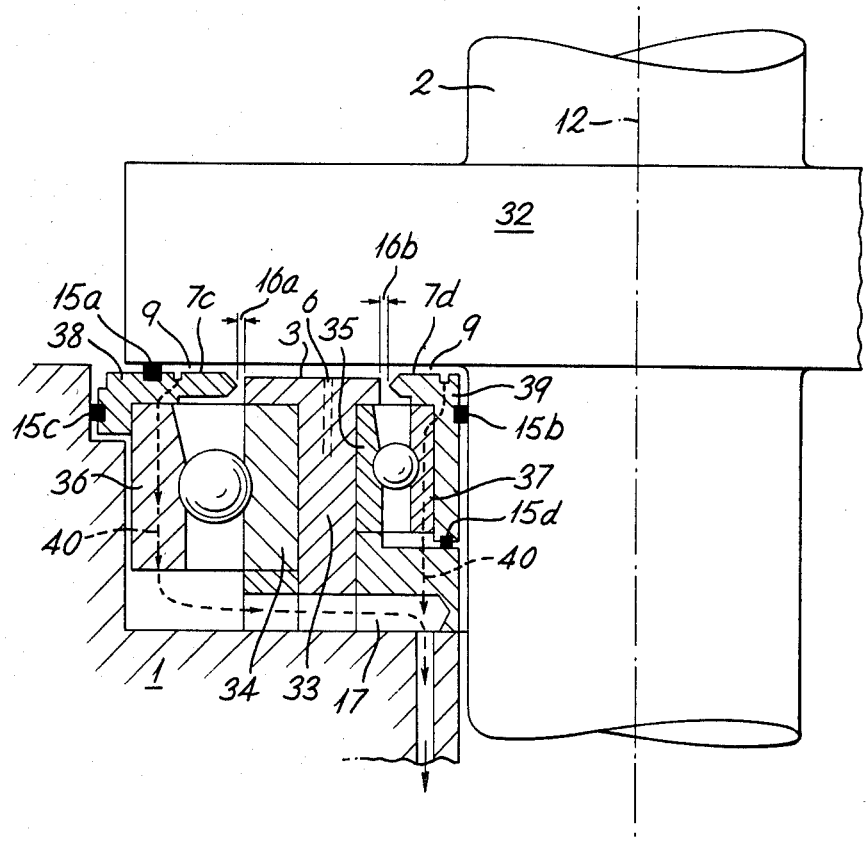
FIG. 7 is a view, partly in elevation and partly in radial section, of a rotary thrust bearing.

The thrust bearing of FIG. 7, which exerts an axially directed thrust against the collar 32 formed on rotating shaft 2, comprises a central T-section part 33 anchored to the main structure of member 1 and carrying the fixed races 34, 35 of two ballbearing units. The moving races 36, 37 of these two units carry concentric ring-shaped members 38, 39 which correspond to the structures 18 of FIGS. 5 and 6 in that they present the surfaces of lands 7c and 7d. Non-contact seals 16a and 16b and seals 15a–15d perform functions similar to parts 16 and 15 of previous figures, the bearing recess 3 lies between the top face of part 33 and the confronting face of collar 32, and conduits diagrammatically indicated 40 perform the same function as ports 22 and conduits 23 of the previous figures in leading the bearing fluid, once it has performed its essential function by passing through the bearing clearances 9, to exhaust by way of conduit 17.

Figure 8:
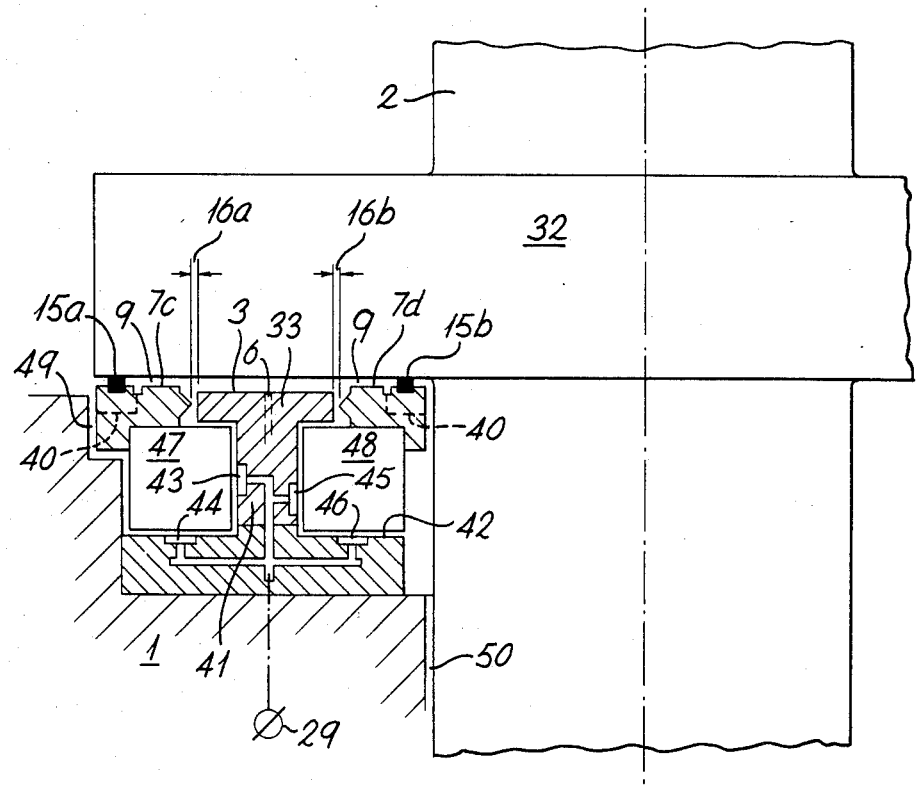
FIG. 8 is a similar view of another thrust bearing.
Figure 9:
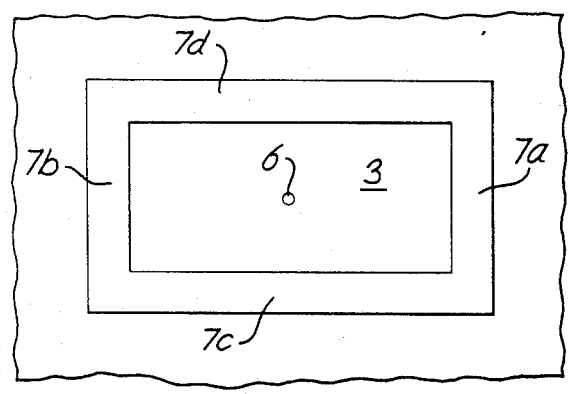
FIG. 9 is a view in the direction of the arrow IX in FIG. 1.

FIG. 8 shows a fluid bearing in which the auxiliary bearings supporting the moving lands 7c, 7d are gas bearings rather than of rolling-contact type. FIG. 8 therefore corresponds to FIG. 7 as FIG. 6 corresponds to FIG. 5. In FIG. 8 the shank 41 of the T-section of part 33 rises from a platform 42. Ports 43–46, formed in the shank and the platform and connected to a common pressurized gas supply 29 as in FIG. 6, in use supply the gas necessary to maintain clearance against two ring-shaped air bearing members 47 and 48 which carry the structures presenting lands 7c and 7d respectively. The gas escapes to atmosphere from bearing 47 by way of passage 49, and from bearing 48 by way of passage 50, and passages 40 conduct the main bearing fluid to exhaust.

The invention is not restricted to the exact features of the embodiments herein disclosed, since alternatives will readily present themselves to one skilled in the art. Thus different types of rolling element bearings, aerostatic pad arrangements, hydrostatic or hydrodynamic pads may be used as support for the circumferential lands. Moreover, the auxiliary bearings carrying the circumferential lands may be fixed to the moving member 2 instead of to the stationary member 1.

I claim:

1. A fluid bearing comprising:
   first and second bearing members, defining between them a space for fluid and adapted in use to move relative to and out of contact with each other under a load tending to bring them into contact;
   means formed in one of said bearing members to connect said space to a source of fluid under pressure;
   at least one third bearing member, supported from said first bearing member and presenting a first bearing surface;
   at least one second bearing surface presented by said second bearing member and confronting said first bearing surface so that such said first and second bearing surfaces define between them a clearance by which said fluid may escape from said space, and in so doing will exert hydrostatic separating force on said first and second bearing surfaces and so resist the said tendency of said load to bring them into said contact;
   an auxiliary bearing supporting any such said third bearing member from said first bearing member, whereby any such said first bearing surface is capable of movement relative to both said first and said second bearing members.

2. A fluid bearing according to claim 1 in which said second and first bearing members comprise a shaft unit presenting a shaft axis and a surrounding housing unit, said shaft unit being rotatable about said axis relative to said housing unit, and in which any such said auxiliary bearing permits its associated said third bearing member to rotate relative to said axis.

3. A fluid bearing according to claim 1 in which any such said auxiliary 25 bearings is of rolling-contact type.

4. A fluid bearing according to claim 1 in which any such auxiliary bearing is a gas bearing.

5. A fluid bearing according to claim 4 including two ring-shaped said third bearing members, lying to opposite sides of said space for fluid and axially-separated relative to said axis.

6. A fluid bearing according to claim 4 including two ring-shaped said third bearing members, lying to opposite sides of said space for fluid and radially-separated relative to said axis.

* * * * *